(12) United States Patent
Adragna et al.

(10) Patent No.: US 7,721,037 B2
(45) Date of Patent: May 18, 2010

(54) DEVICE FOR CONTROLLING POINT-TO-POINT COMMUNICATION BETWEEN A MODULE AND TRANSMISSION BUS

(75) Inventors: Jean-Jacques Adragna, Antibes (FR); Pascal Chapier, Valbonne (FR); Alain Meurlay, Nice (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 58 days.

(21) Appl. No.: 12/123,051

(22) Filed: May 19, 2008

(65) Prior Publication Data
US 2008/0301348 A1 Dec. 4, 2008

(30) Foreign Application Priority Data
May 29, 2007 (FR) ................................. 07 55296

(51) Int. Cl.
*G06F 13/00* (2006.01)
(52) U.S. Cl. ...................................................... 710/305
(58) Field of Classification Search .................. 710/305
See application file for complete search history.

(56) References Cited

U.S. PATENT DOCUMENTS

| 5,212,631 | A | * | 5/1993 | Schmidt et al. ................. 700/7 |
| 5,274,781 | A | * | 12/1993 | Gibart .......................... 710/16 |
| 5,568,610 | A | | 10/1996 | Brown |
| 6,105,091 | A | | 8/2000 | Long |
| 6,237,057 | B1 | | 5/2001 | Neal et al. |
| 6,351,786 | B2 | * | 2/2002 | Elmore et al. ................ 710/303 |

OTHER PUBLICATIONS

U.S. Appl. No. 12/123,044, filed May 19, 2008, Adragna, et al.

\* cited by examiner

*Primary Examiner*—Glenn A Auve
(74) *Attorney, Agent, or Firm*—Oblon, Spivak, McClelland, Maier & Neustadt, L.L.P.

(57) ABSTRACT

A device for controlling point-to-point communication between a module and a transmission bus, the device including a printed circuit that carries the transmission bus and that includes a connection element to connect the module to the transmission bus. The printed circuit includes a communication control unit disposed between the transmission bus and the connection element, the communication control unit includes unidirectional communication logic gates, and a logic control circuit for the logic gates. Such a device may, as an example, find application to programmable controllers.

18 Claims, 1 Drawing Sheet

DEVICE FOR CONTROLLING POINT-TO-POINT COMMUNICATION BETWEEN A MODULE AND TRANSMISSION BUS

FIELD OF THE INVENTION

The present invention pertains to a device for controlling point-to-point communication between a module and a transmission bus. The invention finds a particularly advantageous application in the field of programmable controllers.

DISCUSSION OF THE BACKGROUND

A programmable controller or PLC ("Programmable Logical Controller") is an automatic control facility capable of driving, controlling and/or monitoring one or more processes, in particular in the field of industrial control rigs, construction or electrical distribution.

Of generally modular design, a PLC programmable controller is composed of various modules which inter-communicate through a transmission bus, generally called a "backplane" bus. The modules are fixed mechanically in a rack, which comprises a printed circuit which also supports the backplane bus as well as the connection elements intended to cooperate with connectors generally present on the rear part of the modules so as to effect the necessary link between the modules and the bus. The number of modules depends of course on the size and the type of process to be automated.

Typically, a programmable controller can comprise:
a power supply module providing the various voltages to the other modules through the backplane bus.
a central unit module UC which comprises embedded software ("firmware") integrating a real-time operating system OS, and an application program, or user program, containing the instructions to be executed by the embedded software to perform the desired control operations. The UC module also generally comprises a connection on the front face to programming tools of personal computer PC type.
input/output I/O modules of various types as a function of the process to be controlled, such as digital I/Os or analogue TORs for counting, etc. These I/O modules are linked to sensors and actuators participating in the automated management of the process.
one or more modules for communicating with communication networks (Ethernet, CAN, etc.) or man-machine interfaces (screen, keyboard, etc.).

By way of example, an input/output module can comprise between 1 to 32 I/O pathways, a PLC controller may be capable depending on the model of managing several hundred I/O pathways. If required, several racks are therefore connected together in one and the same PLC. Thus, as a function of the application and the process to be automated, a PLC controller can comprise a large number of modules. It is the user of the PLC controller who therefore decides on the number and positioning of the modules in a rack, as a function of his/her application.

Parallel backplane transmission buses do exist, but henceforth, the backplane transmission bus is often a serial bus. Generally, a serial bus comprises several bidirectional transmission lines and is of the multipoint type in the sense that the bidirectional lines pass through all the connection elements and connectors associated with the various modules connected to the bus.

The equivalent impedance of each line of the backplane bus (line+module connectors+input capacitance of the modules) varies enormously as a function of the number of connected modules and their respective location in the rack, rendering the dimensioning of the bus signals difficult or indeed impossible (=mismatch of the signals). The dimensioning of each multipoint line of a backplane bus, that is to say chiefly the value of the characteristic impedance $Z_0$ adopted for the line as well as its matching at each of the ends of the lines, in fact depends on the presence or otherwise of the modules on the backplane. For example, the more significant the number of modules connected to the backplane bus, the lower the effective characteristic impedance $Z_{0eff}$.

Now, as has just been seen, it is the user who as a function of his/her application fixes the number and also the location of the modules connected in a rack. It naturally follows that optimal dimensioning cannot be obtained in a systematic manner, thus giving rise to a risk of high consumption due to the low equivalent impedance of the line and a risk of mismatching of the signals, with the additional consequence that a mismatched signal causes significant electromagnetic radiation and generates more harmonics.

This instability phenomenon is all the more pronounced the lower the voltage chosen for the bus signals (for example a voltage of 3.3 V instead of a customary voltage of 5 V) with the aim of consuming less energy (so-called "low power" technology). Dimensioning has shown that the traditional approach of multipoint/multiconnector lines is not suited to this "low power" technology.

SUMMARY OF THE INVENTION

So, an aim of the invention is to propose a device which would make it possible to guarantee the capacity of the backplane transmission bus, and therefore the quality of the signal, whatever the number of modules connected and whatever their location.

For this purpose, the invention proposes, on a multipoint backplane transmission bus, to transform the multipoint bidirectional communication lines into as many point-to-point connections between the bus and each controller module connected to the multipoint bus, doing so in a manner that is transparent in relation to the connected modules.

In accordance with the invention, this aim is achieved by virtue of a device for controlling point-to-point communication between a module and a transmission bus, the device comprising a printed circuit which carries the transmission bus and which comprises a connection element intended to connect the module to the transmission bus. The printed circuit comprises a communication control unit disposed between the transmission bus and the connection element, the said unit comprising unidirectional communication logic gates, and a logic control circuit for the said logic gates.

Thus, the control of the bidirectional communication of the signals from the bus to a module is therefore offloaded onto the printed circuit of the backplane, thereby rendering the impedance of the bus independent of the number and location of the connected modules. Advantageously, the multipoint transmission bus permanently sees a fixed number of communication control units, and each module sees a point-to-point bidirectional line with the corresponding communication control unit.

Therefore, only the physical topology of the bus is modified, without the principle thereof and the higher layers of the protocol being affected thereby. The change of topology is transparent in relation to the hardware elements (fan-in, fan-out, module access times) and the application package software which manages the bus protocol. The advantages are as follows:

optimization of the integrity of the signal whatever the number and location of the modules on the backplane bus, reduction in the electromagnetic radiation emitted, modest cost by virtue of the decrease in the constraints of making the printed circuit carrying the lines of the bus, since point-to-point lines are much less constraining than multipoint lines as regards impedance control, connectivity without controlled impedance, standard logic family. It is thus possible to compensate for the cost of the additional extra control logic circuit, extension possible at will, within the limits of the multipoint bus internal to the backplane, transparency in relation to the user since it relates only to the physical layer of the communication protocol.

According to a characteristic, the control circuit is able to apply unidirectional communication control signals to the logic gates, established on the basis of a communication state signal received from the module.

According to another characteristic, the said control signals are also established by the control circuit on the basis of a signal representative of the operating state of the module.

The latter arrangement makes it possible to permit communication between the bus and the module only if the latter is correctly connected and in a fit state to communicate.

The invention in fact makes it possible to solve another technical problem related to the use of a controller. During normal operation, if one of the modules drops out of service, one wishes to be able to replace it without interfering with the other modules of the PLC. It is therefore necessary to be able to extract the failed module while it is powered up, then insert a replacement module, without disturbing the remainder of the configuration of the controller and the running of the program. This is what is called the "hot swap" function. The same situation arises when the user customer decides, as a function of his application or of his process, to remove a module from a location of a rack and/or to add one to an empty location.

To solve the difficulties related to the hot swapping of modules, a first solution has been proposed consisting in carrying out, as a function of the signals applied, a sequencing over time of the electrical connection between the backplane connection element and the connector present on the module, in such a way for example as to ensure the following order of connection when inserting a module: ground, positive supply voltage, useful signals, etc. For this purpose, the known solution proposed envisages giving different lengths, in accordance with the order of connection desired, to the various pins of the backplane connection element or of the connector of the module.

The advantage of this solution is of being certain of the sequencing of the signals when inserting and extracting the module of the backplane. For example, the ground signal always remains connected for a longer time than the positive supply voltage, therefore the corresponding pin will be longer.

On the other hand, this known system exhibits several drawbacks, in particular mechanical wear and especially its cost since it uses non-standard specific connectors. Moreover, it is necessary to provide for a significant length of the pins so as to create length offsets sufficient to obtain time intervals necessary for the insertion/extraction sequences. These significant lengths for the pins of the connectors may turn out to be incompatible with the overall proportions of the programmable controller.

A second existing solution consists in inserting the connector of the module into the backplane connection element by rotation about an axis, thereby making it possible to ensure that the pins close to the rotation axis are connected before those furthest therefrom, when inserting a module following a rotational movement about the axis.

The advantage of this system is identical to that previously described. Its main drawback is that it imposes additional specifications on connectors not initially envisaged for this function. Moreover, tolerancing is difficult to carry out for small products since the connectors will comprise very closely spaced pins, and it may therefore be difficult to obtain reproducible behaviour under any circumstance.

So, an aim of the invention is to propose a device which would allow the hot insertion of a module onto the transmission bus, without disturbing the operation of the other modules already present or disturbing the communication signals circulating on the bus, and while avoiding the mechanical constraints related to the realization of the pins and connectors as in the known systems described above.

For this purpose, according to another characteristic, the device of the invention comprises means which are present in the module for generating the signal representative of the operating state of the module. The said means for generating the validation signal comprise a logic component which receives as input at least one input signal characteristic of a state of the module and which provides the said validation signal only when the said input signal is representative of an operating state of the module compatible with the placing of the module in communication with the transmission bus.

According to another characteristic, the control circuit comprises a logic OR gate between a plurality of state signals received from a plurality of modules, the said OR gate being able to provide a common communication state signal relating to the plurality of modules. The plurality of modules connected to a logic OR gate then constitutes a "virtual module". A set of virtual modules can be assembled in the same manner as the real individual modules, and so on and so forth on several hierarchical levels. This hierarchy makes it possible to optimize the routing and limit the capacitive load at the level of the multipoint lines.

The invention also describes an automatic control facility comprising a transmission bus and a plurality of modules capable of connecting to the transmission bus and comprising at least one such communication control device.

According to the invention, the automatic control facility can also comprise a mechanical system for inserting and extracting the module by rotation about an axis. This system makes it possible in particular to sequence the order of disappearance of signals at the moment of the rotational movement performed while extracting the module. For example, the common point (0V) of the electrical power supply of the module can be applied at a point of the connection element situated in proximity to the said rotation axis, and the said control input is linked to a point of the connection element situated in proximity to an opposite end of the connection element from the said rotation axis.

This use combines the device in accordance with the invention and the rotational insertion/extraction system described above. This combination is indeed achievable even with small dimensions of the automatic control facility, since the device of the invention has made it possible to reduce the number of constrained pins and it is then easier to space them out, to obtain a sufficient offset.

Additionally, it follows from the definition which has just been given of the invention that the latter is not limited solely to the field of programmable controllers and that it extends to any modular system based on a transmission bus of the medium-speed, low-cost "backplane" type, but where the concept of signal integrity is paramount.

BRIEF DESCRIPTION OF THE DRAWINGS

Other characteristics and advantages will become apparent in the detailed description which follows while referring to an embodiment given by way of example and represented by the appended drawings in which.

DESCRIPTION OF PREFERRED EMBODIMENTS

Figure 2:
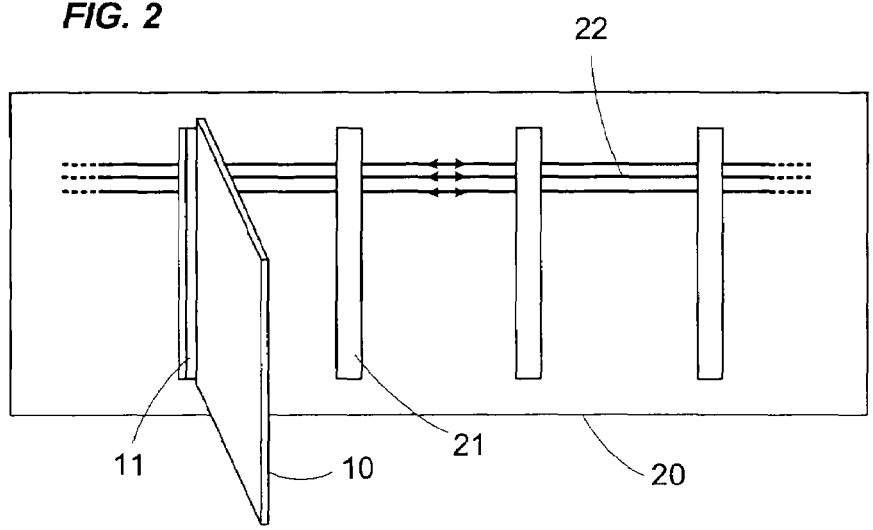

With reference to FIG. 2, a modular automatic control facility of the programmable controller type, exhibits a fixed part of backplane type which comprises a backplane printed circuit 20, to which several modules 10, such as I/O modules, can be connected or disconnected at will. This printed circuit 20 carries a multipoint transmission bus 22 serving the various locations of modules of the automatic control facility.

The backplane circuit 20 comprises a plurality of connection elements 21, of backplane connector or pin type, each being intended to receive a corresponding connector 11 (of connector or pin type complementary to the connection element 21) of a module 10 when the latter is inserted into a location in the rack of the automatic control facility. Once inserted, the electrical link between the connection element 21 and the connector 11 of the module 10 allows in particular the module 10 to be electrically energized and to be capable of communicating with other modules of the automatic control facility through the transmission bus 22.

Figure 1:
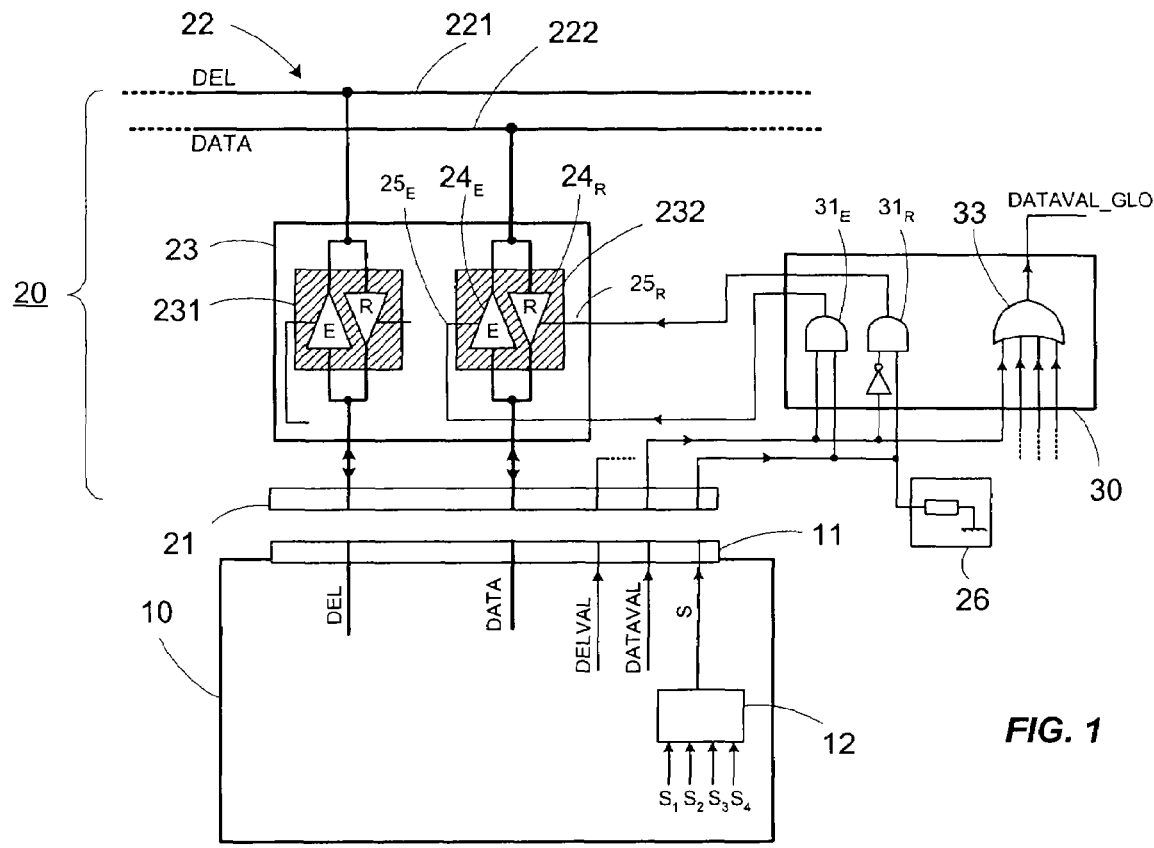
FIG. 1 gives a basic diagram of a point-to-point communication control device in accordance with the invention, FIG. 2 very schematically represents a conventional example of a backplane bus in a programmable controller.

The bus 22 corresponding to the example of FIG. 1 is a multipoint serial bus chiefly comprising two bidirectional transmission lines 221, 222:

a line 221 DEL (for delimiter) which corresponds to a bus clock provided by means of gating pulses (for example at a frequency of the order of about ten MHz) by the communication exchange master module, a line 222 DATA for transporting the data actually exchanged on the bus 22.

The serial bus 22 is of floating master type. The designation of the master module is determined by an additional line (not represented and called an arbitration pathway) of the bus, the operation of which is independent of the arrangements of the invention. This bidirectional arbitration pathway is in fact managed directly as multipoints between the various modules, this not presenting any drawbacks since the frequency of this arbitration signal is much lower than the other signals of the bus.

A master module can take the initiative for an exchange on the bus. A slave module is permanently listening to the bus and can only respond to a request from the master module. By default, all the modules which are not sending listen. When a module is not master, it must therefore remain in reception listening to any request sent by the master of the bus. At any moment, a module is aware of its role: either it is the master and therefore the sole sender on the bus, or it is listening to the bus. The arbitration pathway makes it possible to manage the designation of the floating master module.

In reality, the DATA line 222 is composed of two signals, namely a bidirectional DATA signal actually transporting the data and a DATAVAL communication state unidirectional signal which makes it possible to distinguish the sender of the data on the bus 22. As shown by FIG. 1, this DATAVAL signal is sent by each module 10. By default, a module systematically sets its DATAVAL signal so as to be permanently receiving the data circulating on the bus 22, for example by giving DATAVAL the logic value 0. When a module 10 wishes to send, it inverts the DATAVAL signal to the logic value 1 throughout the duration for which it sends its data.

The explanations which have just been given for the DATA line 222 apply in the same manner to the DEL line 221 which therefore in reality comprises a DEL signal and a DELVAL signal. For the sake of simplification, only the manner of operation relating to the DATA line of the bus is illustrated in FIG. 1.

According to the invention, the communication control device comprises a communication control unit 23 which is disposed on the circuit 20 between the connection element 21 and the transmission lines of the bus 22, and which serves to control communication between a module 10 and the bus 22.

The unit 23 thus plays the role of communication logic barrier between the module 10 and the bus 22. It is composed of two bidirectional communication assemblies 231, 232 linked respectively to the DEL 221 and DATA 222 transmission lines of the bus 22. Each assembly 231, 232 comprises two unidirectional communication components which are disposed mutually head-to-tail so as to permit or not permit communication between the module 10 and the bus 22 in one or the other direction. These unidirectional components are referenced $24_E$ in the send direction (module to bus) and $24_R$ in the receive direction (bus to module). They are constituted, in the example presented, by three-state logic gates (also called tri-state buffers).

Thus, in a rack, there is a communication control unit 23 at the level of each location of a module whose communication with the bus 22 it is desired to control. The presence of a unit 23 at each module location makes it possible to pass from a multipoint backplane bus to a point-to-point communication between each unit 23 and the corresponding module 10.

Each of the three-state logic gates $24_E$, respectively $24_R$, comprises a control input $25_E$, respectively $25_R$, that operates as follows:

if the signal applied to the control input of the three-state logic gate is a validation signal of logic value 1, the input of the logic gate $24_E$, respectively $24_R$, is copied over to the output of the logic gate. The module 10 can then communicate with the bus 22 in send, respectively in receive mode.

on the other hand, if the signal applied to the control input of the three-state logic gate is a passivation signal of logic value 0, it places itself in a high-impedance state, thereby isolating its output and any communication between the module 10 and the bus 22 is prevented through this component.

Advantageously, when the passivation signal is applied to the control input of a three-state logic gate, this in fact creates a high impedance between the inputs and the outputs of this logic gate, that is to say between the signals of the transmission bus that are present on the backplane circuit and the signals of the transmission bus that are present on the connection element of the corresponding module.

It may be seen in FIG. 1 that the communication control device also comprises a logic control circuit 30 intended in particular to provide the unidirectional communication control inputs $25_E$ and $25_R$ for the three-state logic gates $24_E$ and $24_R$, as a function of the DATAVAL and DELVAL state signals provided by the module 10, as was explained above.

Moreover, the logic circuit 30 also takes into account a validation signal, arising from the module 10 and representative of the operating state of the module 10. FIG. 1 also shows that the module 10 comprises a logic electronic component 12 able to generate an output S connected at input to logic "AND" gates $31_E$ and $31_R$ of the logic circuit 30.

The output S is generated by the logic component 12 on the basis of one or more input signals $S_1$, $S_2$, $S_3$, $S_4$, etc. representative of an operating state of the module 10. The principle is that if the logic component 12 establishes that the values of this or these input signals are compatible with satisfactory placing of the module 10 in communication with the bus 22, the output S provides a validation signal of value 1 so as to activate the assemblies 231, 232. Conversely, if the module 10 is not ready to communicate because at least one of the input signals $S_1$, $S_2$, $S_3$, $S_4$, etc. indicates that the module 10 is not in a compatible state for satisfactory communication with the bus 22, the output S of the logic component 12 provides a passivation signal of value 0, thereby disabling the assemblies 231, 232.

Within the framework of very simple embodiments, a single input signal S1 of the logic component 12 can be envisaged, in particular by being linked to the positive voltage (for example +5V) of the module via a resistor. In this case, the validation signal of value 1 indicates only that the module 10 is indeed energized.

In practice, it is however preferable that the output S of the logic component 12 results from a combination of a set of logic conditions established on a plurality of signals $S_1$, $S_2$, $S_3$, $S_4$, etc. characteristic of various states or modes of operation of the module 10, such as for example: the presence of power supply or supplies of the module, the absence of any defect on the module, the confirmation of proper execution of a test sequence or of initialization of the module, etc. This makes it possible to ensure that the module 10 is not only correctly energized but also in a fit state to operate correctly before it is placed in communication with the bus 22.

It is also possible to envisage a logic startup sequence to be executed before delivering the validation signal: detection of a sufficient voltage threshold in the module, then standby step so as to be sure of the completeness of insertion of the signals and the precharging of capacitors, then execution of a boot sequence inside the module, etc.

Equally, the logic component 12 can be integrated into a microprocessor of the module 10 or can constitute a particular component.

It is also possible to see in FIG. 1 the presence on the backplane circuit 20 of a passivation module 26 intended to generate a passivation signal by return to ground through a resistor of low value when the module 10 is not connected to the backplane, and therefore when the output S is not present on the connection element 21. Thus, when the module 10 is not inserted into the rack, good isolation between the signals of the bus 22 on the backplane circuit 20 and the connection element 21 is advantageously permanently ensured.

It is obvious that, according to the type and characteristics of the bidirectional communication assemblies 231, 232 used, the values of the validation and passivation logic signals applied to the control inputs $25_E$ and $25_R$ could equally be inverted, namely 0 for the validation signal and 1 for the passivation signal. In this case, the generation of the output S would be modified accordingly and the resistor of the module 26 would be returned to the positive voltage of the circuit 20.

The DATAVAL signal and the operating state output S of the module 10 are processed by the "AND" gates $31_E$ and $31_R$ of the logic circuit 30. In the example presented, the "AND" gate $31_E$ receives directly as input the output S and the DATAVAL signal and provides an output linked to the unidirectional communication control input $25_E$ to drive the corresponding gate $24_E$. The "AND" gate $31_R$ receives as input the output S and the inverse of the DATAVAL signal and provides an output linked to the unidirectional communication control input $25_R$ to drive the corresponding gate $24_R$. The manner of operation is then as follows:

if the output S provides a validation signal (that is to say for example=1), indicating that the module 10 is ready to communicate, and if the DATAVAL signal is at 1, indicating that the module 10 is ready to send on the bus 22, then the control input $25_E$ for the unidirectional send component $24_E$ of the assembly 232 associated with the DATA line 222 is validated, while the control input $25_R$ for the receive component $24_R$ is invalidated (component $24_R$ in the high-impedance state). Thus, only communication in the send direction (that is to say module 10 to bus 22 direction) is permitted.

If the output S provides a validation signal and if the DATAVAL signal is at 0 indicating that the module 10 is on standby waiting to receive messages coming from the bus 22, then the control input $25_R$ for the receive component $24_R$ associated with the DATA line 222 is validated, while the control input $25_E$ for the send component $24_E$ is invalidated (component $24_E$ in the high-impedance state). Thus, only communication in the receive direction (that is to say bus 22 to module 10 direction) is permitted.

If the output S provides a passivation signal (that is to say=0) indicating that the module 10 is absent, poorly inserted or not in a state to communicate, the control inputs $25_E$ and $25_R$ equal 0 and this creates a high impedance between the inputs and the outputs of the two unidirectional components $24_E$ and $24_R$ of the assembly 232, thus preventing any communication of the module 10 with the DATA line 222 of the bus 22. In this way, the backplane bus is not affected by any spurious signals while extracting the module 10 and when the module 10 is absent.

The manner of operation described above is identical for the DELVAL signal associated with the output S and the unidirectional components of the assembly 231 managing the DEL line 221 of the bus 22.

It may therefore be observed that the bus 22 thus always sees the same number of communication control units 23 whatever the number and location of the modules actually present in the rack and in a fit state to operate. The impedance and the topology are fixed since they are independent specifically of the number and location of the modules.

Additionally, the use of the DATAVAL and DELVAL signals, already available at the level of the module 10, allows a lower-cost embodiment of the control circuit 30 for the unidirectional components $24_E$ and $24_R$.

Preferably, the control circuit 30 consists of a logic module embodied by CPLD ("Complex Programmable Logical Device") technology. A CPLD module is a component comprising logic gates preprogrammed in an internal memory of FLASH type. It makes it possible to rapidly execute, at lower cost, simple elementary logic equations between various signals, without requiring any microprocessor or specific ASIC.

For optimization and cost reasons, a single CPLD module 30 can process the logic corresponding to a plurality of locations on the bus 22 and can therefore manage several communication control units 23, for example four. This is a compromise between modularity and cost. In this case, for a rack with 12 locations, only three CPLD modules would then be required.

Furthermore, it may be more advantageous to implement the various bidirectional assemblies 231 and 232 outside of the CPLD modules, so as to place these assemblies as close as possible to the connection elements 21 and therefore to minimize the distance of the point-to-point connection between the unit 23 and the module 10.

In order to further reduce costs, the bidirectional assemblies 231, 232 use a cheap standard logic technology, such as for example LVC, TTL, CMOS.

Additionally, the control circuit 30 comprises an "OR" gate 33 which receives the DATAVAL communication state signals for the various modules 10 connected to locations which are managed by this same control circuit 30. As output, the "OR" gate 33 provides a global communication state signal DATAVAL_GLO, which is the image of the assembly of modules managed by the circuit 30. Likewise, the circuit 30 also comprises another "OR" gate (not represented in FIG. 1) receiving the DELVAL signals so as to provide a global signal DELVAL_GLO.

Thus, the assembly of modules managed by the circuit 30 then constitute a "global virtual module" providing the global communication state signals DATAVAL_GLO and DELVAL_GLO (in a manner equivalent to a module 10 which provides the signals DATAVAL and DELVAL). As indicated above, assemblies of virtual modules such as these can be connected in the same way, and so on and so forth on several hierarchy levels.

The invention claimed is:

1. A device for controlling point-to-point communication between a module and a transmission bus, the device comprising:
   a printed circuit that carries the transmission bus and that comprises:
      a connection element to connect the module to the transmission bus;
      a communication control unit disposed between the transmission bus and the connection element, the communication control unit comprising at least one bidirectional communication assembly including unidirectional communication three-state logic gates disposed mutually head-to-tail; and
      a logic control circuit connected to the logic gates in the communication control unit to apply unidirectional communication control signals to the logic gates to control whether the module operates in a) a send or receive mode or whether b) communication to or from the module is prevented.

2. A device according to claim 1, wherein the control circuit applies the unidirectional communication control signals to the logic gates on the basis of a communication state signal received from the module.

3. A device according to claim 2, wherein each logic gate is in a high-impedance state in absence of a corresponding unidirectional communication control signal.

4. A device according to claim 2, wherein the control circuit comprises a logic OR gate receiving as an input a plurality of communication state signals for a plurality of modules, and providing as an output a global communication state signal relating to the plurality of modules.

5. A device according to claim 2, wherein the logic control circuit is embodied by CPLD technology.

6. A device according to claim 2, wherein the unidirectional communication control signals are also established by the logic control circuit on the basis of a validation signal representative of an operating state of the module.

7. A device according to claim 6, further comprising means in the module for generating the validation signal representative of the operating state of the module.

8. A device according to claim 7, wherein the means for generating the validation signal comprises a logic component that receives as an input at least one input signal characteristic of a state of the module and that delivers as an output the validation signal when the input signal is representative of an operating state of the module compatible with placing of the module in communication with the transmission bus.

9. A device according to claim 1, wherein the communication control unit comprises two bidirectional communication assemblies each including two unidirectional logic gates disposed mutually head-to-tail.

10. An automatic control facility comprising:
    a transmission bus;
    a plurality of modules capable of connecting to the transmission bus; and
    at least one communication control device according to claim 1.

11. A device for controlling point-to-point communication between a module and a transmission bus, the device comprising:
    a printed circuit that carries the transmission bus and that comprises:
       a connection element to connect the module to the transmission bus;
       a communication control unit disposed between the transmission bus and the connection element, the communication control unit comprising at least one bidirectional communication assembly including unidirectional communication three-state logic gates disposed mutually head-to-tail;
       a logic control circuit for the logic gates, wherein the communication control circuit applies unidirectional communication control signals to the logic gates, established on the basis of a communication state signal received from the module; and
       the logic control circuit comprises a logic OR gate receiving as an input a plurality of communication state signals for a plurality of modules and providing as an output a global communication state signal relating to the plurality of modules.

12. A device according to claim 11, wherein each logic gate is in a high-impedance state in absence of a corresponding unidirectional communication control signal.

13. A device according to claim 11, wherein the logic control circuit is embodied by CPLD technology.

14. A device according to claim 11, wherein the unidirectional communication control signals are also established by the logic control circuit on the basis of a validation signal representative of an operating state of the module.

15. A device according to claim 14, further comprising means in the module for generating the validation signal representative of the operating state of the module.

16. A device according to claim 15, wherein the means for generating the validation signal comprises a logic component that receives as an input at least one input signal characteristic of a state of the module and that delivers as an output the validation signal when the input signal is representative of an operating state of the module compatible with the placing of the module in communication with the transmission bus.

17. A device according to claim 11, wherein the communication control unit comprises two bidirectional communication assemblies each including two unidirectional logic gates disposed mutually head-to-tail.

18. An automatic control facility comprising:
    a transmission bus;
    a plurality of modules capable of connecting to the transmission bus; and
    at least one communication control device according to claim 11.

* * * * *